July 15, 1969     D. G. GIES, SR     3,455,159
NAUTICAL WEATHER STATION
Filed July 6, 1966     2 Sheets-Sheet 1
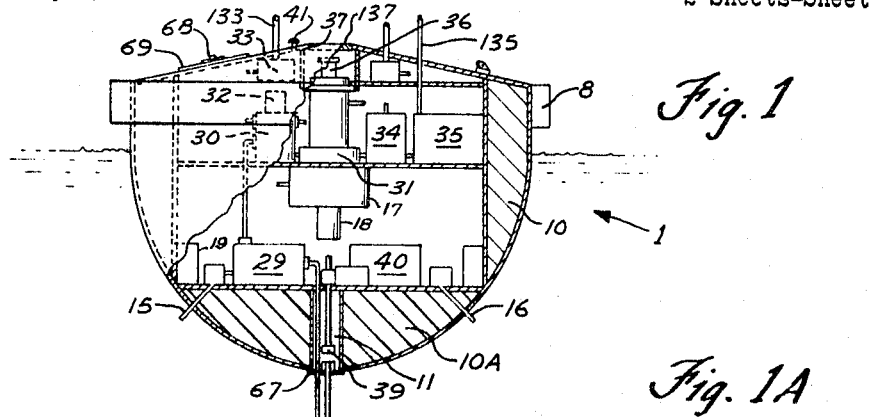
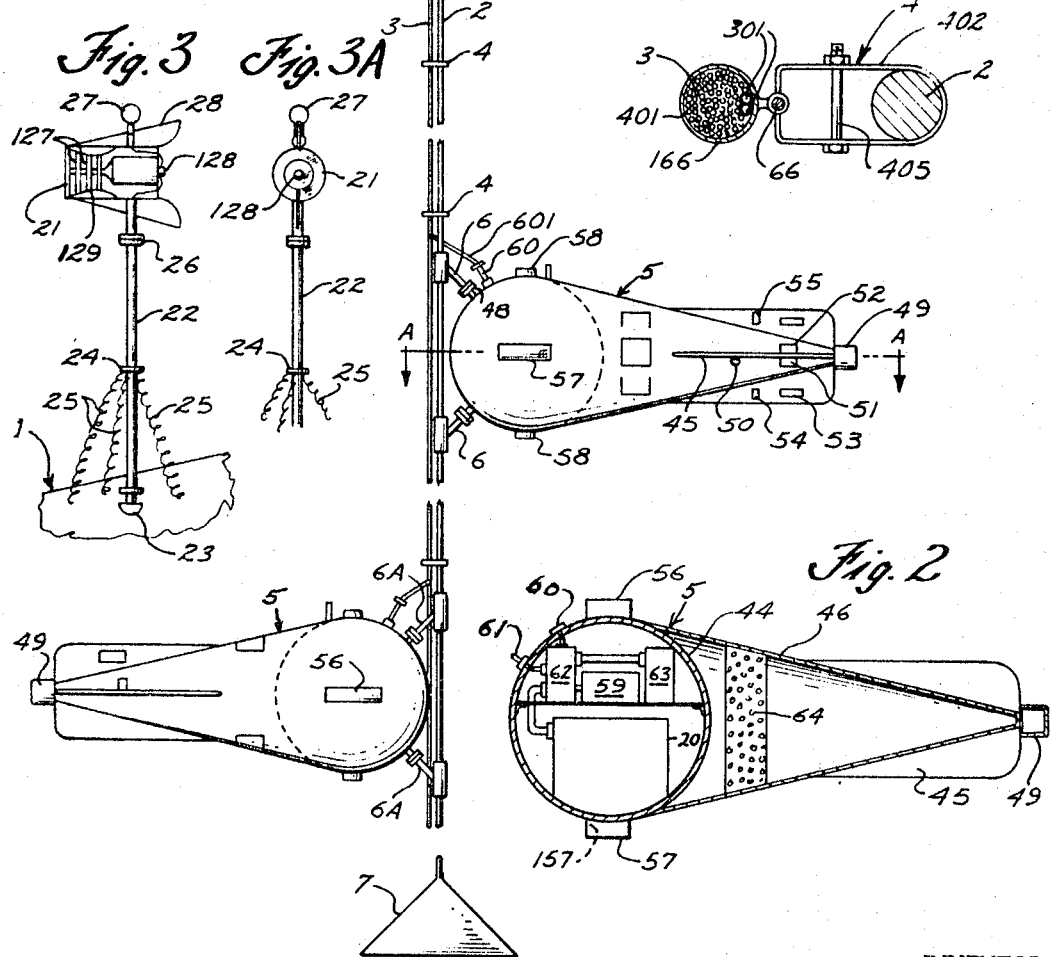
INVENTOR
DONALD G. GIES, SR.
BY  Thomas & Thomas
ATTORNEYS July 15, 1969  D. G. GIES, SR  3,455,159
NAUTICAL WEATHER STATION
Filed July 6, 1966  2 Sheets-Sheet 2
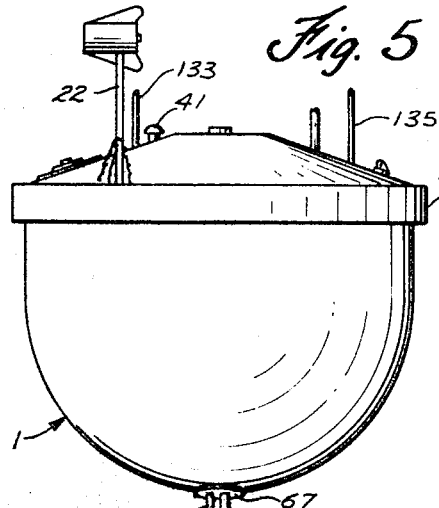
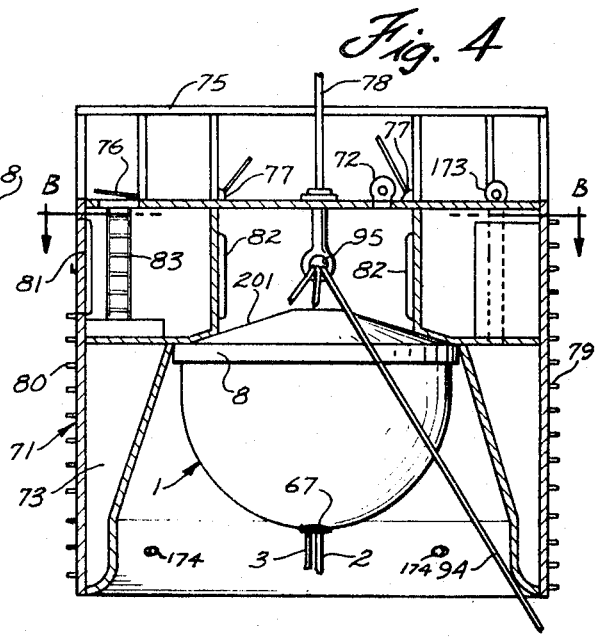
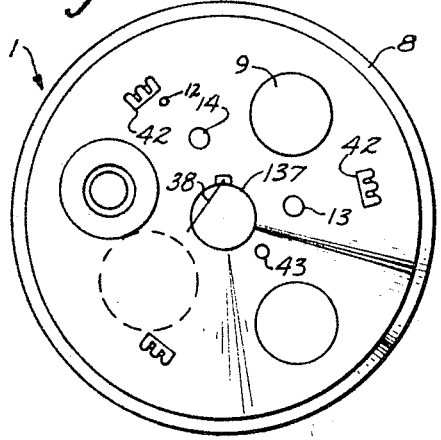
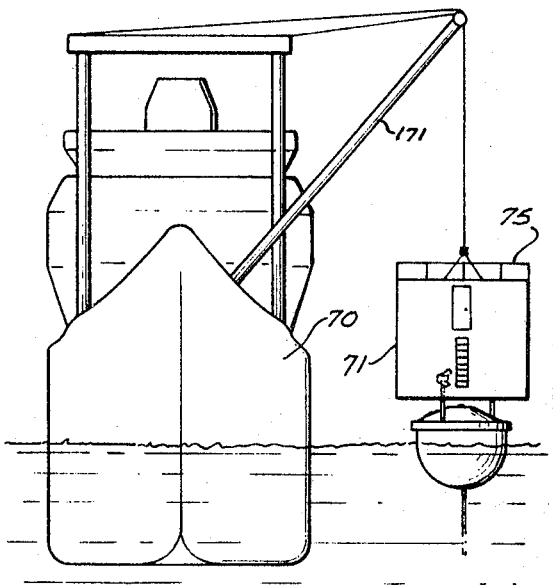
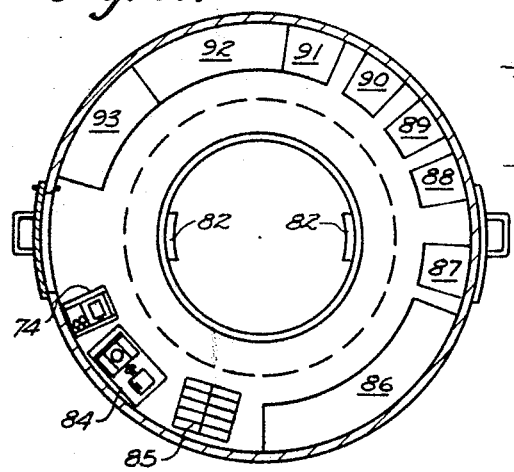
INVENTOR
DONALD G. GIES, SR
BY *Thomas & Thomas*
ATTORNEYS United States Patent Office 3,455,159
Patented July 15, 1969

3,455,159
NAUTICAL WEATHER STATION
Donald G. Gies, Sr., 313 Jack Coleman Drive NW.,
Huntsville, Ala. 35005
Filed July 6, 1966, Ser. No. 563,187
Int. Cl. G01w 1/00
U.S. Cl. 73—170                                10 Claims

ABSTRACT OF THE DISCLOSURE

A nautical weather system, useful also in detecting enemy submarines, etc., includes one or more floating buoys, a weighted cable attached to each buoy, and one or more hollow submerged bathymetric vehicles attached at various depths to the cable. Both the bathymetric vehicles and the buoy are equipped with means for sensing various weather and environmental data which the submerged vehicles transmit to the buoy. The unmanned buoy transmits all data to remote receiving stations on interrogation.

---

Buoyed weather stations have been used in the past, but in many respects they have not been entirely satisfactory. According to the present invention an unanchored buoyed weather station may be provided which supports a cable. This cable may be a very long one, for use in deep ocean, but it usually will not reach bottom. The cable is weighted at the lower end thereof, and one or more bathymetric vehicles are attached at various points along the cable. For example, beginning at a point at least 100 feet below the surface of the sea a first bathymetric vehicle may be attached, and at various appropriate intervals below the first vehicle, additional bathymetric vehicles may be attached. This normally will be spaced at intervals, preferably uniform, of 500 or 1000 feet, for as deep as it is cared to take readings. Power is supplied to all instruments in these vehicles from the surface unit which is in the form of a buoy containing the necessary power supplying equipment and other components.

The surface buoy carries as many sensors for gathering weather data and sea surface data as may be desired. These instruments may include, for example, a wind direction and velocity mast, equipped with strain gauges, a combination hygrometer and surface air temperature probe, a barometric pressure sensing transducer, a television camera which takes pictures of the sky overhead, and such other and/or additional units as may be desired. Desirably, also, the unit comprises an electric generator which is driven by the wind so as to keep batteries properly charged. All these units are installed in or upon the buoy in appropriate manner to make a compact unit suitable for the purposes of this invention.

The bottom surface of the buoy also preferably is equipped with instruments including an ocean-water temperature probe or a plurality thereof, and a sensor for the chloridity or chlorine content of the sea water. The surface buoy also preferably includes a gimbal mounted magnetic compass and also a gimbal mounted gyrocompass. These may be used to measure the local magnetic variation from true North.

In addition, the surface unit preferably comprises a combination drift and vertical wave motion sensor, or these may be separate instruments.

In use, stations of this type may be used singly, but they are preferably used in groups disposed in a grid pattern in the ocean, and allowed to drift with the current. They may be set up at predetermined intervals and thereby obtain weather data over a large area. The separate units are interrogated periodically for their data and their location. The television picture of the stars at night may be used to assist in determining position of the buoy for each station.

Other instruments may be used in the apparatus, either in the surface vessel or in one or more of the bathymetric vehicles. For example, a sensor for turbidity at the sea surface, and at various intervals below, may be installed either on the buoy or on one or more of the bathymetric vehicles. Sensors for plankton and other animal and vegetable life may be included. These units per se are known and do not constitute particularly important parts of the invention.

The units described may all be coordinated to provide data which may be transmitted in appropriate manner to data handling computer equipment, either mounted on the surface vehicle or located at a remote point. This equipment then will be provided with data by radio, radar and other known means.

A wind turbine of appropriate type has been designed for use on the surface buoy, comprising a unit which is quite simple in form but highly effective for generating maximum power from the wind currents. This also constitutes a feature of the invention. The latter device can be used on other vehicles such as small power boats, sailing vessels, and the like, particularly when these are lying at anchor. Such, of course, is highly useful for keeping batteries charged and providing continuous electric power. Electricity has long been generated by small wind turbines, but the device which forms an element of this invention is particularly designed for and is highly suitable for use on vehicles stationed or moving in the ocean.

Additional features of novelty comprise particular means by which the bathymetric vehicles may be secured to the weighted cable depending from each surface buoy at the appropriate intervals beneath the water surface. The system has particular utility, for example, for gathering data about submarines and assisting in anti-submarine warfare. The weather station aspects are highly useful in connection with large area surveys, for example, for determining the inception and direction and power of hurricanes. The system can be used to study ocean currents in the depths as well as at the surface.

The system has obvious utility for gathering scientific data which may be useful not only to the naval forces but also for private research and for other Government agencies such as the Coast and Geodetic Survey. It may be used for studying plant life and animal life in the sea, with appropriate observation devices being mounted on the surface vehicle and on one or more of the submerged bathymetric vehicles.

The invention will be more fully understood by reference to a detailed description of a presently preferred system. In the attached drawings:

FIG. 1 is a vertical view, partly in section, of a station unit;

FIG. 1A is an enlarged view of a cable connector unit;

FIG. 2 is a horizontal sectional view through a bathymetric vessel taken, for example, along the line A—A, FIG. 1;

FIG. 3 is a detailed elevation view of a wind turbine generator accessory;

FIG. 3A is a side view of the apparatus of FIG. 3;

FIG. 4 is a vertical elevation, partly in section, showing a servicing tank, mounted over a surface buoy;

FIG. 4A is a view of FIG. 4, taken along the line B—B, FIG. 4;

FIG. 5 is a side view of the surface buoy, certain parts being omitted;

FIG. 5A is a top view of the unit of FIG. 5;

FIG. 6 is a more or less diagrammatic view of a surface ship tender for placing, recovering and servicing the station equipment.

Referring now to the drawings, and particularly to FIG. 1, a surface buoy 1 has attached thereto a main weighted cable 2 and a power and signal cable 3. The latter is suitably insulated and is attached to the main anchor cable at suitable intervals by clamps of appropriate design indicated at 4. As shown in FIG. 1A, each clamp consists of a loop 402 around the main weighted or anchor cable 2, and secured to a small cable 66 of high tensile strength which is secured to signal cable 3 by a unitized molded sheath 166. A clamp bolt 405 makes it possible to clamp the device at any point on the cable 2. A plurality of bathymetric vehicles 5 may be attached to suitable depths to the cables, two of them being shown; but it will be understood that the number may be much greater, if desired. The first of these is preferably attached about 100 feet below the surface of the water. A second vehicle may be attached 500 or 1000 feet below the first, and so on, up to a mile or more in depth as desired, depending on the data to be obtained.

Properly spaced branch line assemblies 601 and cable attaching assemblies 6 are provided to connect each bathymetric vehicle to the power and signal cable 3 and the weighted cable 2, respectively. The lower end of the weighted cable supports a heavy cable weight 7. In ordinary use this will not contact the ocean floor, although it may do so and serve as an anchor if desired, particularly in shallow water. Where stations are placed in deep water, the anchor cable weight normally serves to keep the cable tight but does not prevent drifting. Because of its shape and location, the weight tends to dampen out bobbing of the surface buoy, and thereby stabilizes the whole system.

The entire assembly is designed ordinarily to drift in the direction of the resultant ocean current. Since the surface unit extends only to a very limited degree above the water surface it is not much affected by wind, so far as drift is concerned.

As noted above, units 6 are used to secure the bathymetric vehicles 5 to the main cable 2. The former take most of the strain imposed on the vehicles so that there is no danger of breaking the power and control line 601 as shown in FIG. 1. There must be two such attaching assemblies 6 attached to each bathymetric vehicle, one above and one below the vehicle to stabilize its depth since the bathymetric vehicles are hollow and substantially self-buoyant.

The surface vehicle or buoy 1 may be enclosed for service within a suitable structure as indicated at 71, FIG. 4, to be described in greater retail hereinafter.

A bumper or fender 8, made of rubber or other suitable plastic elastic material, surrounds the buoy at or near its water line and prevents damage to the buoy and any vessel that might collide therewith. Suitable access panels, one of which is shown at 9 in FIG. 5A, are provided to permit ease of inspection and maintenance of equipment. The buoy is provided internally with compartments filled with suitable flotation material 10 and 10A which may be cork, expanded plastic material, sponge, or the like, as is well known. This material also provides thermal insulation as well as buoyancy, and helps to stabilize the temperature in the equipment compartment of the buoy. A well 11 is provided in the bottom compartment and extends through the bottom flotation material 10A. This provides a passageway for the power and signal cables as well as a sump for gathering seepage water. It will be understood that the well around the cables 2 and 3 is sealed at the lower point of the buoy, to keep water from flowing in.

As indicated above, the buoy may contain a number of instruments, including sensors for gathering weather and sea surface data. A wind direction and velocity mast 12 equipped with strain gauges is shown, and a combination hygrometer and surface air temperature probe 13. See FIG. 5A. A barometric pressure transducing device 14 is provided also on the upper surface of the buoy.

On the bottom surface of the buoy or towards the bottom are an ocean water temperature probe 15, FIG. 1, and a chlorinity probe 16. See FIG. 1. These are of conventional design. A combined gyro compass and magnetic compass unit is shown at 17. This is gimbal mounted on the vertical center line of the buoy near its mid point in elevation. It provides a measure of local magnetic variation from true North, as previously mentioned. A combination surface drift and vertical wave motion sensor 18 is provided under the compass, also mounted on the buoy center line.

The system is provided with suitable electric power means. Batteries 19, one or more, are used in the surface buoy instead of isotopic power sources which have been suggested in some cases, because of the danger of possible collision with surface ships. However, isotopic power sources may be used if desired, particularly when energy requirements are substantial and long life and stable power are required. Such sources may be placed either in the surface buoy or in one or more of the bathymetric vehicles. An example is shown at 20 in the first bathymetric vehicle. This may be preferred since the vessel is well below the surface of the water, and there is relatively little danger of collision, particularly with any surface objects.

The battery or batteries may be kept suitably charged by utilizing a surface driven wind generator. This is shown as a turbine generator assembly 21 in FIG. 3. The unit is mounted on a mast 22 which is secured to the top of the buoy and mounted for pivotal action by means of a ball swivel joint 23. A collar 24 part way up the mast provides an anchoring means for three erecting springs 25. Obviously, these provide stable support for the mast, but permit it to be deflected in the case of heavy waves, collision, or other strong forces. The erecting springs are attached to the buoy surface about 120° apart when three are used, and they provide the necessary force to re-erect the generator mast in case it is displaced, e.g. by heavy wave collision and the like.

Power generated by the turbine unit is conducted by suitable cable on the mast through a swivel slip ring joint indicated at 26, and thence to the batteries. Some power is tapped off this cable to provide necessary energy to operate an amber flashing beacon 27. The latter is mounted on top of the generator. Rows of turbine blade discs are indicated at 127, and they are keyed to a common generator driving shaft 128 which operates within a venturi 129. With a light breeze these provide sufficient torque to drive the generator 128A. The discs or blades 127 may be molded of strong plastic material suitably reinforced or may be made of corrosion-resistant metal. Weather vaning of the generator assembly is provided at 28 to keep the unit directed into the wind.

Signals received from the various bathymetric vehicles are transmitted through cables 601 and signal cable 3 into the power and signal junction box 29 located within the surface buoy. These signals then pass into a pre-recorder signal conditioner 30. Other sensor signals are wired to enter the power and signal junction box or they may go to the pre-recorder signal conditioner directly. After the signals are suitably conditioned, they are placed on a multi-channel magnetic tape contained in a tape recording unit 31. A clock pulse generator 32 provides timing pulses necessary for operational sequencing of all systems. It also places time marks on the magnetic tape. In a preferred method of operation, the tape recorder may be pulsed to read out all sensor outputs every six minutes. This time period, of course, may be varied. The information thus is stored on the tape until it is read out during the interrogation phase of the operation.

Interrogation of the data is triggered by the reception and validation of a proper interrogation signal which comes to a beacon decoder and transponder assembly 33 mounted in the upper part of the buoy. This unit is of well known type and it has an antenna mast 133 for receiving signals from the interrogating vessel or station. In a preferred form, the interrogation signal consists of coded pulses containing an address and a label assigned to the particular surface buoy. All other interrogation signals are rejected and reradiated. That is to say that each buoy has its own signal frequency or code so that it can respond properly to the exclusion of all others.

When a valid interrogation signal is received, the clock pulse generator will trigger the tape recorder to operate in its fast mode, that is, at high speed. In this operation the tape reels in the recorder are driven rapidly. The stored information passes through a port-recorder signal conditioner 34 mounted in the surface vehicle. It then passes to the transmitter receiver assembly 35 where it is broadcast as digital and/or analog data from a suitable antenna system 135. After the tape recorder has transferred its information to the transmission system, it erases the tape and resets itself. Recording is made at low speed mode for obvious reasons. The tap may be rewound automatically for reuse. The beacon decoder and transponder generates a secondary indentification signal which is impressed on the magnetic tape just prior to recording of information, and also at the end of the tape message.

In one typical operation a particular weather station may be interrogated every six hours, or four times in each 24 hour period. A television camera 36 mounted on gimbals provides an important navigational function. At least once every 24 hour period this television camera is operated so as to take pictures of the star background. This background is then used to plot the position of the migratory buoy. On overcast nights this location information may not be available. However, the change of position of the buoy which has occurred since a previous valid star fix may be approximated by extrapolating the previous course plot. Also, the wind direction and the known ocean currents will give some guidance as to location until another reading of the stars can be obtained. The cloud cover information itself often will be useful data.

A porthole 37 is covered by a lens 137 located in the top surface of the buoy so that the camera can take its pictures through this lens. A wiper assembly 38, FIG. 5A, much like an automotive windshield wiper, is activated just prior to camera operation. It is turned off after the camera is stopped. The signals obtained from the camera are fed directly into the post-recorder signal conditioner 34 where they are properly conditioned for transmission.

A sump pump 39 is provided to pump out seepage water at suitable intervals, with an appropriate control such as a float operated switch, to initiate and stop its action as required. An environmental control unit 40 and a pressure vacuum vent 41 are provided to maintain proper environmental conditions within the equipment area. Suitable lifting cleats 42, FIG. 5A, are provided so that the buoy can be picked up and hoisted onto a vessel when needed. An occulting electric light 43 is located in the upper surface of the buoy and provided with photo-sensitive control so that it will be activated at dusk and turned off at dawn. The beam from this light is directed upward and is intense enough for visibility at night, thus helping to avoid ship collision.

Referring now to FIG. 2 a bathymetric vehicle will be described in greater detail. The main part of such vehicle or vessel is the deep submergence hollow sphere 44. This sphere is made from suitable corrosion-resistant metal, for example, aluminum clad or equivalent, and is capable of withstanding high pressures. For example, it may be built to withstand 3000 lbs. per square inch, or more. It is provided with stabilization fins 45 which are attached to the faired body section 46. The faired body section is of thinner walls, since water may be admitted inside of it. Thus only the sphere need be of sufficient strength to resist the water pressure. The entire assembly is attached to the anchor cable by the attaching assemblies 6 and branch line assembly 601 previously mentioned.

Each bathymetric vessel contains suitable sensors for its function. Thus each may contain an earth magnetic field flux sensor 49 attached to its stern. Attached to a vertical fin may be light intensity sensors 50 to determine the light at various depths in the sea. Radioactive material sensors 51 may also be provided and electromagnetic sensors 52. A water temperature sensor 53 is attached and a depth pressure sensor 54 is provided, preferably to the vertical fin. A deep ocean gravity sensor 55 may also be attached to the vertical fin or rudder.

Mounted on one side of the sphere, for example the starboard side, see FIG. 1, the lower unit, is a combination plankton sampler and chlorinity/chlorosity sensor 56. Mounted on the port side of the sphere is a combination turbidity and density/specific gravity sensor 57. The latter also contains a current measuring device in the form of a venturi 157. This measures the differential or resultant current flowing at that particular depth. Due to fin action, the bathymetric vehicles will tend to swing into the stream of the resultant current, like a weathervane.

Submarine detecting sensors 58 are provided on top and bottom of the sphere 44. These may be highly sensitive sound detectors or other types. Inside the sphere there is provided a combination gyro and magnetic compass 59. Like the related instrument in the surface vessel, this compass provides means for ascertaining local magnetic variation from true North and may be used to check the instrument in the buoy, if desired. This information permits the plotting of isoconic lines for the particular operating depth. It also indicates the bearing of the resultant current at that depth.

The necessary electrical power as well as control signals may enter and leave the sphere through the power and signal connector lines 60 which connect to the line 601 and on to cable 3, as shown in FIG. 1. External sensor signals enter the sphere through a sensor connector 61. The sensor operating power also passes through this connector, and the power and signal lines are secured at signal junction box 62. Signals which need special conditioning enter the combination signal conditioner and time sharing relay module box 63. Signals are relayed to the surface buoy on command from the clock pulse generator previously mentioned. By time sharing the signal carrying wires in the cable bundle with the other bathymetric vehicles, the number of pairs of bundle wires in the control cable 3 can be kept to a minimum. Ballast 64 may be added as needed to balance or overcome the buoyance of the hollow bathymetric vessels.

The anchor cable 2 is made of corrosion resistant steel or equivalent material for long life. In an appropriate case the cable may be about 1″ in diameter and extend to a depth of 1 mile or more. The anchor cable weight 7 may be any suitable heavy material; for example, a cast block of concrete or equivalent. The overall cable length may be reduced to a shorter length if the surface weather station is to be placed over the continental shelf. In general, placements in shallow water will not be migratory when anchoring becomes practical, as in shallow waters. However, the system may be made migratory, even in shallow waters, if desired.

The power and signal cable bundle 3 is molded to a weight-carrying cable 66. Clamp 4 assembles the power and signal cable assembly 3 and 66 to anchor cable 2 as previously described. The weight carrying cable 66 is a relatively small one, approximately ¼″ or so in diameter. It is made of corrosion resistant steel or equivalent material. It may be attached, along with the anchor cable 3 to a mooring plate 67 bolted to the bottom of the surface buoy. A feed-through connector is provided on the mooring plate 67 in order to feed, through the power and signal cable, information and power.

The power and signal cable bundle, as shown, contains two large power supply wires 301 in addition to an adequate number of signal wires and a common ground wire, as will be obvious to those skilled in the art.

Since the surface buoy will contain specialized sensors, recorders and electronic transmission equipment which in wartime, at least, may have great military and intelligence value, measures must be taken to safeguard this equipment against theft by any unfriendly group or power. Also, the bathymetric vehicles as well as the buoy must be protected from theft. Some of the equipment used may have security value, hence anti-tampering or self-destructive detonating devices are employed throughout the system where security is required.

The surface buoy access panels are electrically interlocked so that they cannot be opened without proper authority. The equipment compartment in the surface buoy is lined with a grid of breakaway wires so as to discourage intrusions. A combination lock 68 in one of the access panels, FIG. 1, provides a means for obtaining legitimate access. Upon working the combination of this lock, a safe door 69 is opened, exposing a safe and arm device. By use of a suitable tool or key the device may be activated or inactivated. Breaking the interlock, without proper entry when the system is activated, can initiate a destruction system.

The surface buoy lifting cleats 42, previously mentioned, are instrumented with strain gages to register the lifting strain so that unauthorized attempts to pick up the buoy will initiate an explosion. If the safe and arm device is in the armed or activated position an overload due to attempts to lift the buoy out of the water will initiate the self-destructive system to prevent enemy access to or capture of the equipment.

The mooring plate 67 is attached to the bottom of the surface buoy will explosive bolts when the full destruction system is applied. In this case, when the self-destruction system is activated, the explosive bolts can be set to fire and thus disconnect the mooring plate and the attached cables from the surface buoy. This will drop all elements below the buoy to the ocean bottom.

The bathymetric vehicles are also instrumented, where security is needed, with pressure sensing devices to initiate the self-destruction system if the vehicle is raised or lowered more than a predetermined amount. For example, if an attempt is made to lift the whole system on a vessel by an appreciable distance, say 50 feet, the self-destruction system in each bathymetric vessel may be activated. In such an attempt a separation flange may be separated by the explosive arrangement, allowing the bathymetric vehicles to detach from the cable and sink to the bottom of the ocean. In such cases the bathymetric vehicles may be provided with excess ballast 64 so that they will sink when disconnected from the surface buoy. All secretive or classified instruments or devices also may be individually equipped with self-destruction devices. If any one system is tampered with, this may initiate a signal to destroy that particular unit, and if desired, a sympathetic destruction signal may be generated to destroy any or all other systems simultaneously. These arrangements may be varied as desired, as will be obvious to those skilled in the military art of destroying confidential devices.

In typical deployment, the equipment may be spaced over a grid system having 600-mile squares to begin with, for example, in the Atlantic Ocean or the Pacific Ocean between a latitude of 40° south and 40° north with surface buoys positioned at appropriate corners of the grids. As the system shifts, the shape and size of the original squares will change. The surface buoys may be identified and interrogated by satellites or by long-range aircraft. For weather observation on a closer scale, they may be spaced at grid positions of 100 miles to say 180 miles apart, depending on the equipment available and the particular problem to be studied. With equipment placed at such intervals retransmission from one surface buoy to another may become possible so that the grid itself may be self-operating. It will be understood that the grid dimensions may be irregular. Even if regular at first, differential drift will soon make them irregular.

Ordinarily, sufficient shore based interrogation stations and suitably deployed interrogation ships may be provided at appropriate distances from the grid to interrogate the equipment directly at each station or unit and obtain the necessary data. In each case, the unit interrogated will identify itself by suitable code, giving its location, etc., as well as the additional data desired. Upon receiving a validation signal from a particular surface buoy, the shore station or ship may command the buoy to transmit its information, using the appropriate code. Information so demanded may come back directly to the interrogating station or ship may command the buoy to transmit its ployment, spacing, and retransmission techniques. These may be varied to suit the area and spacing of the vessels.

Since the surface buoy and bathymetric vehicles will migrate in the direction of a resultant current, additional scientific information about the ocean and its currents may readily be obtained. The actual drift pattern gives an indication of the current routes, submarine sea mount ridges, etc.; if above the mile depth setting of the anchor, for example, the weight 7 may hang up. This will stop the drift of the affected buoys and thus outline sea mounts and ridges, showing their presence and their orientation. The system thus can be used for large scale ocean surveying.

When data is to be acquired by satellites, it may be transmitted to the central computer system in a manner similar to that practiced by the TRIOS system. When data is acquired by aircraft it may be processed, and the most important information can be transmitted immediately over existing communication networks. Less pertinent data may be transmitted at a later time, being temporarily recorded, e.g. on tape, etc. Preliminary data reduction may be accomplished aboard the aircraft and the reprocessed information may be transmitted when and as desirable.

When used for submarine detection, with units of equipment spaced at suitable intervals, a master display board may be mounted in the home office or main base on which can be displayed the current tracks of all submarines operating in the world's oceans. Such changes in position may be updated as desired, with no information being more than six hours old, for example. The data obtained from the bathymetric vehicles permit accurate, up-to-date plotting of the changes in the thermocline.

Referring next to FIGS. 4 and 6, there are shown a surface ship tender 70 which is modified for placement recovering and relocating either the surface buoys or the bathymetric vehicles or both. This tender vessel is of conventional type. It should be capable of lifting the servicing tank 71, FIG. 4, as well as the surface buoy and the bathymetric vehicle assembly from or to its deck. Provision may be made for storing surface buoys and bathymetric vehicles in their respective holds in vessel 70. Anchor cable lockers as well as power and signal cable assembly lockers will be provided for stowing these materials.

The servicing tank unit 71, FIGS. 4 and 6, is of closed top and open bottom bell design. It is employed between the tender vessel 70 and the surface buoy 1. When a surface buoy/bathymetric vehicle has been installed on location by the tender the buoy servicing tank 71 is lowered over the top of the surface buoy. Because of the design of the buoy servicing tank 71, air is entrapped inside the bell as the tank is lowered over the surface buoy. The trapped air compresses and dampens out the bobbing action of the surface buoy. Upper deck pressure vacuum vents 72 may be adjusted to relieve the entrapped air if there is an unbalanced condition. When the buoy servicing tank is settled over the surface buoy, the bumper 8 is compressed to form a seal between the surface buoy and the internal annulus of the buoy servicing tank at the working deck level.

An annular flotation tank 73 located in the bell of the buoy servicing tank may be flooded, e.g. by opening a vent valve 173, FIG. 4, to give stability to the servicing tank and still prevent resting excessive weight on the surface buoy. Before the buoy servicing tank is retracted, all of the water is blown from the annular tank by compressed air from the tender. Alternatively, compressed air may be provided by a unit 74 mounted right on the buoy servicing tank working deck. Additional vent valves 174 are shown in FIG. 4.

The top deck of the servicing tank is provided with a safety rail 75, a crew hatch 76, pressure vacuum vent valves 72, cable attaching cleats 77, and a lifting cable sling 78. An external ladder 79 permits crew members to climb from the deck of the ship or tender vessel to the top deck of the buoy servicing tank. Another external ladder 80 permits crewmen to climb from the ship's deck directly into the working deck area to door 81. Both external ladders provide crew entrance to or egress from the servicing tank, via a small surface craft such as a whale boat or the like.

Doors 82 are located in the inner wall to provide access to the surface buoy deck 201. Internal ladder 83 provides crewman access to and from the top deck. Mounted on the work deck in addition to the air compressor skid 74 are an engine generator skid 84 and a battery skid 85. See FIG. 4A. Also provided on the work deck are a stowage compartment 86, a power supply rack 87, an automatic checkout and fault isolation console 88, a surface buoy sub-system calibration and checkout rack 89 and the bathymetric vehicle subsystem calibration and checkout rack 90.

In operation, a crew is placed aboard the buoy servicing tank before the latter is lifted off the tender or ship. Since the crew may spend several hours on board the buoy servicing tank performing their duties, suitable quarters for their convenience and comfort may be provided in the form of a crew's head 91, crew's quarters 92 and crew's galley 93.

After the surface buoy/bathymetric vehicle system has been located on station and the servicing tank is held above it, the latter with the crewmen contained therein is lowered over the buoy. Upon stabilizing the unit the crewmen can open the inner wall doors 82 and gain access to the deck of the surface buoy 201. They can then check to ascertain that all the self-destructive equipment is in inoperative position, which may be accomplished by operating the combination lock 68 and safe door 69 previously mentioned. The safe and arm device which is then exposed may be inactivated by use of a suitable tool and thereafter the remaining access panels may be removed. Thereupon various other items of equipment may be checked for operability and serviced if necessary. Normal supply of spare parts are aboard the servicing tank. After the integrity of all the systems has been verified, the lifting cable sling 94 is removed from the surface buoy lifting cleats 42 previously mentioned and may be stowed on a ring or hook 95 mounted on the inner wall of the buoy servicing tank. The access panels then may be replaced, the safe and arm device reactivated, the combination lock safe door is closed, and the unit is returned to service. The servicing tank is then hoisted onto the service ship tender 70. The buoy servicing tank may be stowed on a suitable cradle aboard the latter vessel.

Referring in more detail to FIG. 6, the surface ship tender 70 is specially designed to handle the surface buoys and the bathymetric vehicles, as well as the buoy service tank unit 71. It carries a crane or loading arm 171, with suitable hoist means for lifting the service unit, the buoys, or the bathymetric vehicle completely out of the water and on board the ship, when desired. It contains compartments, not shown in detail, for stowing a plurality of surface buoys and a suitable number of bathymetric vehicles in their respective holds. Lockers are provided for the anchor cables 2, as well as for power cables 3. Suitable lockers are also available for miscellaneous instruments and parts, as well as for replacement items.

Maintenance shops for the equipment are also provided on board the ship 70. These are not shown in detail, but their general character will be obvious.

Servicing operations are summarized as follows:

After the surface buoy/bathymetric vehicle has been emplaced the buoy servicing tank, with crewmen, is lowered over the surface buoy. Upon stabilizing the buoy servicing tank the crewmen open the inner wall doors and gain access to the deck of the surface buoy.

The very first duty a crewman performs after gaining access to the deck area is to ascertain that all ordnance devices are in a safe condition. This is accomplished by operating the combination lock and opening the safe door 69. The safe and arm device is now exposed. If the safe and arm device is not in the safe position the crewman, by using a suitable tool, places the device in a safe position. With this accomplished, the remaining access panels are removed.

The applicable interconnecting cables are connected from the automatic check-out and fault isolation console. An automatic check-out run is made and if all systems are "go," system integrity is established. The check-out equipment is disconnected and access panels secured.

However, if a fault is discovered it is isolated to its particular subsystem. The interconnecting cabling from the applicable sub-system calibration and check-out rack is made and the fault is cleared. The fault may be cleared by adjusting the effected module to bring it into calibration, or replacing the module with a stockable spare that is stowed aboard the buoy servicing tank. A confidence check must now be run using the automatic check-out and fault isolation console.

The batteries are checked for the proper charge and if the charge is low, they are recharged from the self contained power generating equipment within the buoy servicing tank. Faulty and defective batteries are replaced from storable spares.

After the integrity of all systems has been verified the lifting cable sling 94 is removed from the surface buoy lifting cleats 42 and stowed on hook 95 mounted on the inner wall of the buoy servicing tank. The access panels are replaced and the safe and arm device is enabled. The combination lock safe door is closed and the crew makes preparation for hoisting the buoy servicing tank aboard the service ship tender.

All buoy servicing tank doors are secured and as the ship's winch takes up the lifting cable slack the crewmen blow the water from the buoy servicing tank's annular tank. The buoy servicing tank is stowed in a suitable cradle aboard the service ship tender.

To recover a surface buoy/bathymetric vehicle the buoy servicing tank is emplaced over the surface buoy and the safe and arm device is disenabled as described above. All bathymetric vehicle ballast 64 is dumped from their respective hoppers by proper switch settings.

The combination lock safe door is then closed and the lifting cable sling 94 is attached to the surface buoy lifting cleats.

The buoy servicing tank is taken aboard the servicing ship tender as described previously. The surface buoy/bathymetric vehicle is now hoisted aboard the tender. As the surface buoy/bathymetric vehicles and cable assemblies come aboard they are detached and placed into their assigned storage areas. When installing a surface buoy/bathymetric vehicle the components and cable assemblies are installed and assembled in the inverse order from which they are retrieved.

The migratory bathmymetric fence and ocean weather station is an integrated system. The overall system provides weather, scientific, and anti-submarine warfare data while drifting in the open ocean. Equipment is provided for, in place, maintenance on the many sub-systems and for relocating the surface buoys/bathymetric vehicles as the need arises.

The number of sensors chosen and electronic systems indicated or implied shall not be considered as inclusive since only a sufficient number of components and systems have been illustrated to describe the general parameters of the overall system. No attempt has been made to illustrate all possible multiples of the overall system, nor is the maximum operating depth of the system to be limited to one mile.

It will be understood that modifications to this overall system may be made without departing from the principles of this invention.

It will be understood that the system just described is an integrated system for obtaining weather, scientific and anti-submarine warfare data while drifting in the open ocean. Equipment is provided for maintenance on the various sub-units and for relocating the surface buoy assemblies/bathymetric vehicles as the need arises.

It will be understood also that while a large number of sensors and other instruments have been mentioned, they need not all be used, or additional ones not mentioned but obvious to those skilled in the art may be employed in their place. Various other modifications may be made, as will readily occur to those skilled in the art. It is intended by the claims which follow to cover the equipment and its obvious variations as broadly as the prior art properly permits.

What is claimed is:

1. A nautical weather and analogous data system which comprises, in combination, a floating surface buoy, a weighted cable extended from the bottom of said buoy, at least one hollow bathymetric vehicle attached to said cable, means on said bathymetric vehicle for obtaining various data, signal carrying means independent of said cable and connected between said buoy and said bathymetric vehicle for transmitting said vehicle data to said buoy, means on said buoy for obtaining additional data independently, and means on said buoy for transmitting both vehicle data and buoy data to a distant receiver.

2. System according to claim 1 wherein remotely controllable means are provided on the surface buoy for initiating transmission of said data to a distant receiver.

3. System according to claim 1 which includes temperature pressure sensing devices in both the surface buoy and the bathymetric vessel.

4. System according to claim 1 where a plurality of bathymetric vehicles are employed.

5. System according to claim 1 wherein the buoy includes a television camera for observing stars overhead and thereby determining its position in the ocean, and means for transmitting the televised data to a distant receiver.

6. A system for obtaining weather and other environmental data from a large area of the ocean which comprises a plurality of drifting units spaced at predetermined or determinable positions with respect to each other and with respect to an interrogating station, each unit comprising a floating buoy, means on said buoy for sensing and recording said data, a weighted cable extending downwardly from said buoy, a bathymetric vessel attached to said cable, separate means on said vessel for obtaining said data, and means on said buoy responsive to a predetermined signal from said interrogating station for transmitting data from both said buoy and said vessel to said interrogating station.

7. System according to claim 6 where at least one of said drifting units includes means for communicating directly with other units.

8. System according to claim 6 where a plurality of bathymetric vessels are connected at vertical intervals from each other and to a single buoy.

9. System according to claim 6 which includes an electric battery power supply and a wind turbine generator for keeping the battery power supply charged.

10. A system according to claim 6 which includes means for providing integrated logistic support, including maintenance, spare parts and personnel to the surface weather station and bathymetric vehicle and means for maintaining operational integrity thereof.

References Cited

UNITED STATES PATENTS

| 1,947,018 | 2/1934 | Plastino. | |
| 2,756,404 | 7/1956 | Anderson et al. | |
| 3,214,728 | 10/1965 | Higgins. | |
| 3,299,398 | 1/1967 | Hershey et al. | 340—2 |
| 3,314,009 | 4/1967 | Murdock. | |
| 3,329,015 | 7/1967 | Bakke et al. | |
| 3,344,420 | 9/1967 | Arsove | 340—2 X |

RICHARD C. QUEISSER, Primary Examiner

JERRY W. MYRACLE, Assistant Examiner